May 21, 1968 E. H. PERRY ET AL 3,384,068
GAS OVEN SYSTEM
Filed Dec. 9, 1966

INVENTORS:
EDWARD H. PERRY
CARL A. STAS, JR.
BY Howson & Howson
ATTYS.

3,384,068
GAS OVEN SYSTEM
Edward H. Perry, Parma, and Carl A. Stas, Jr., Cleveland, Ohio, assignors to American Gas Association, Inc., New York, N.Y., a corporation of New York
Filed Dec. 9, 1966, Ser. No. 600,476
9 Claims. (Cl. 126—21)

This invention relates to gas oven systems and particularly to those suitable for thawing, warming or cooking of food products.

The usual gas cooking oven provides temperatures in the oven cavity which are adequately high, sufficiently quickly reached, and sufficiently uniform for ordinary food cooking purposes. However, there are certain respects in which further improvements are desirable, particularly where the oven is to be used for the reheating of frozen foods. In the latter case the food must be thawed, and usually must be further warmed above room temperature or even cooked. With conventional ovens the substantial potential advantages in convenience offered by packaged frozen foods, for example, are partially offset by the time required to reheat them. It is therefore desirable to provide more rapid oven heating than is provided by conventional ovens. For versatility, it is often desirable that the oven be effective for ordinary cooking and warming purposes, and, whether used for ordinary cooking or for reheating, it is generally desirable that the oven release minimum heat to the room, provide substantially uniform heating at least near the central portion of the oven cavity, be operable without producing excessive surface temperatures at the exterior of the oven walls, consume fuel gas at a low rate, provide sufficiently complete combustion of the fuel gas, and be simple, convenient and inexpensive to make and use.

One form of oven which has been proposed for increasing the rate of heating and for reducing fuel consumption is designated as the "muffle" oven, in which a combustion gas flow path is provided through a muffle passage between inner and outer oven walls surrounding the oven cavity, and forced circulation is provided for the oven gases within the oven cavity, as by means of a fan. While such muffle ovens with forced circulation are to a certain extent successful in increasing the heat transferred from the oven walls to the food rack and hence in increasing the rate of heating of the oven cavity, the construction of the muffle oven is relatively complex, and even further reductions in the time required to bring the oven cavity initially up to the desired operating temperature would be advantageous.

Accordingly it is an object of the invention to provide a new and useful gas oven system.

Another object is to provide such a gas oven system which produces an increased rate of heating of the oven cavity.

Another object is to provide such a gas oven system which is simple, compact and relatively inexpensive.

Another object is to provide such a gas oven system which is economic in its use of gas, which permits a satisfactorily low surface temperature at the exterior of the oven and minimum heat release to the surrounding room, and which permits a substantially uniform temperature over the greater part of the oven cavity.

These and other objects of the invention are achieved by the provision of a gas oven system comprising an oven cavity for receiving the material to be heated and a gas burner compartment adjacent the oven cavity having an inlet for fuel gas and an inlet for atmospheric air to produce a combustible mixture in the combustion chamber, the burner compartment having an outlet to the oven cavity through which hot combustion gases pass to the oven cavity. The arrangement therefore is of a direct-firing type in which the hot combustion gases directly heat the interior of the oven cavity. In addition, the system utilizes forced recirculation of oven gases through the oven cavity so that the hot combustion gases are appropriately diluted and mixed to provide substantially uniform heating in the oven cavity, and so that the surface of the food product or other object to be heated in the oven is subjected to a moving stream of hot combustion gases whereby the relatively cooler thin layer of gases which normally tends to exist on the surface of the food product is continuously blown away and replaced by the hot combustion gases and the rate of heating of the food product thereby increased.

The system for recirculating the oven gases employs gas-moving means such as a blower which withdraws gases from one part of the oven cavity and forces them into another part of the oven cavity, thereby establishing a recirculatory flow through the oven, through the gas-moving means, and back to the oven. The gas-moving means directs the flow of recirculated gases into the oven at one or more points adjacent the outlet through which the hot combustion gases flow from the combustion chamber into the oven cavity, and along the direction of flow of said combustion gases into said oven cavity.

With this arrangement, direct-fired forced-circulation heating of the oven cavity is provided while using air at atmospheric pressure for combustion, as opposed to a pressurized source of air. The direction of the recirculatory flow of gases upon its entrance to the oven is such as to produce a reduced-pressure aspirating effect in the oven cavity adjacent the point at which the hot combustion gases enter it from the combustion chamber, thereby assuring that under no conditions of operation will there be a positive back pressure, or even a zero pressure, at the outlet of the combustion chamber such as would interfere with the influx of sufficient atmospheric air for complete combustion in the combustion chamber.

In addition, a vent is provided for the oven cavity which normally extends through an outer casing to atmosphere, the vent being of such a size and location as to permit the escape of oven gases to the exterior at a rate sufficient to permit introduction of atmospheric air into the combustion chamber at the rate required for complete combustion; the rate of exit of oven gases through the vent is small compared with the rate of recirculatory flow of oven gases in the oven cavity so that a large proportion of the combustion heat is effective in heating the oven cavity and the food product therein, rather than being lost through the vent.

Preferably the combustion chamber has walls of high thermal conductivity, so that combustion heat produced therein is transmitted to the exterior of the walls, and the latter walls are disposed in the path of the recirculating oven gases outside the oven cavity so that additional heating of the recirculated gases is provided by the hot combustion-chamber walls.

Preferably also, means such as protuberances extending transverse to the air stream are provided for increasing the turbulence of the flow of oven gases in the oven cavity and for dispersing the hot combustion gases throughout the cavity so as to produce a substantially uniform temperature at various regions therein and so as to enhance the removal of the then cooler layer of air from all sides of the material to be heated.

Other objects and features of the invention will be more readily understood from a consideration of the following detailed description, then in connection with the accompanying drawings, in which.

Figure 1:
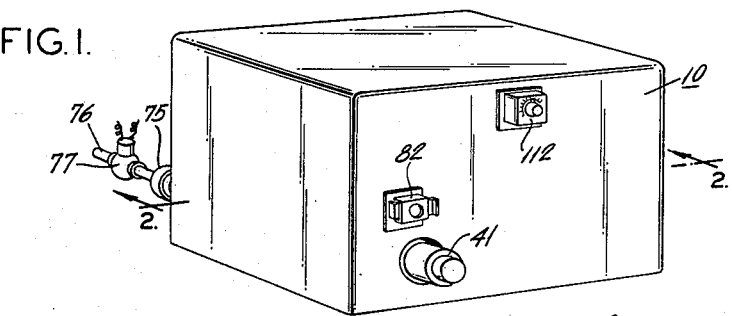
FIGURE 1 is a perspective view of one form of oven system embodying the invention.
Figure 2:
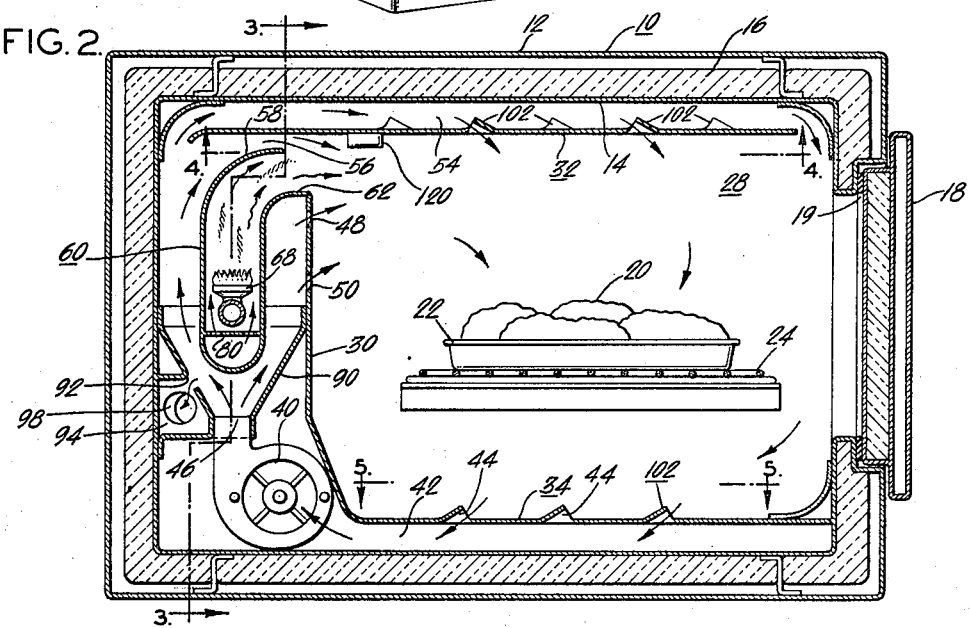
FIGURE 2 is a transverse sectional view of the apparatus of FIGURE 1 taken along the lines 2—2.
Figure 3:
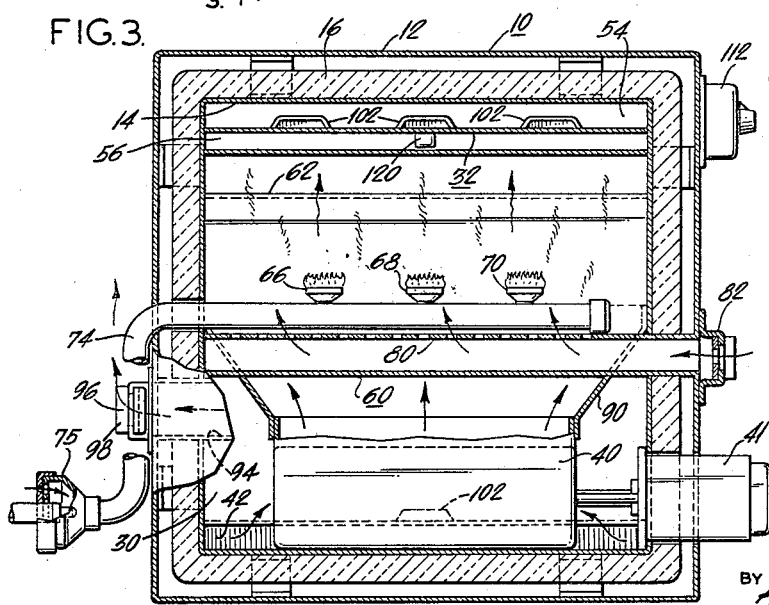
Figure 4:
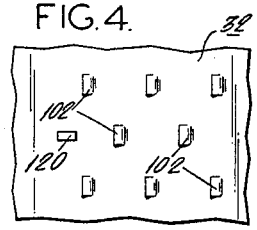
Figure 5:
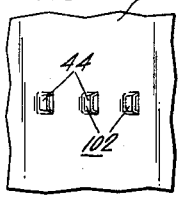

FIGURE 3 represents a section of the apparatus shown in FIGURE 1, taken along the lines 3—3 of FIGURE 2; and FIGURES 4 and 5 are fragmentary views of air-flow distributing arrangements located respectively at the top and bottom of the oven cavity, taken along the lines 4—4 and 5—5 of FIGURE 2, respectively.

Referring now to the embodiment of the invention shown in the drawings by way of example only, there is employed an insulating casing 10 made up of an exterior metal wall 12, an interior metal wall 14 supported from wall 12, and an intervening thermally-insulating layer 16. A suitable insulated door 18 with appropriate sealing gasket 19 is provided at one end of the structure to permit insertion and removal of the material to be heated, which may comprise the frozen-food product 20 which is to be thawed and warmed. The food product 20, contained in a tray 22, rests upon a suitable food rack 24 supported from the interior wall 14 of the oven casing; more than one rack and tray may of course be used. The oven cavity 28 is formed by the top, bottom, door-end and sides of the casing, and by the interior partition wall 30. The oven cavity contains upper and lower louvered flow-distributing plates 32 and 34 respectively, the effective usable portion of the oven cavity being located between these plates.

Interior partition wall 30 extends transversely entirely across the interior of the oven cavity and is sealed to the lower flow-distributing plate 34. The region inside the casing between the interior partition wall 30 and the left-hand end of casing 10 in FIGURE 2 contains a blower 40 driven by an electric motor 41 which draws oven gases into axially opposite ends of the blower from the passage 42 beneath lower louvered plate 34, thereby to produce a net downward flow of oven gases from the oven cavity through the louvered openings such as 44. The outlet end 46 of the blower 40 directs the recirculating oven gases upwardly between the interior partition wall 30 and the adjacent end of the casing 10, and returns it to the oven cavity by way of apertures 48 and 50 in interior partition wall 30, by way of the passageway 54 between the upper louvered plate 32 and the top interior surface of casing 10, and by way of another passageway 56 between the lower surface of the upper louvered plate 32 and an exterior surface 58 of a combustion chamber 60. In this way the blower 40 produces a continuous, relatively high-velocity recirculatory flow of hot oven gases through the oven cavity, out of the oven cavity to the blower 40, and into the oven cavity again, as indicated by the arrow in FIGURE 2.

The combustion chamber 60 is spaced from and between the interior partition wall 30 and the adjacent interior end wall of casing 10, so that its exterior surfaces lie in the path of the recirculated gases passing on each side thereof. The combustion chamber 60 has walls which are preferably of a thermally conductive material such as steel and is in the form of an upright channel extending completely across the transverse dimension of the oven cavity, the upper end of the combustion chamber 60 being curved toward the oven cavity so that its outlet 62 is directed into the oven cavity near the top thereof but below the upper louvered plate 32. The lower end of the combustion chamber 60 is preferably generally semi-cylindrical so as to provide for smooth flow of the recirculating hot combustion gases around the bottom thereof.

Combustion chamber 60 contains near the lower end thereof gas burners 66, 68 and 70 supplied with gaseous fuel from a pipe 74 extending through the casing 10 to the usual venturi arrangement 75 for supplying primary air, and thence to the usual gas supply line 76 by way of a solenoid valve 77. It is understood that suitable means for igniting the burners will also be provided, which may be for example of the pilot-burner type or of the electrical ignition type. Secondary and dilution air is supplied from beneath the burners in the combustion chamber by means of an air supply manifold beneath the burners and formed by the bottom of the combustion chamber and a partition 80 extending across the lower portion of the combustion chamber. The manifold communicates with the atmosphere exterior to the casing by way of a suitable adjustable shutter 82 for adjusting the desired rate of inflow of atmospheric air. Partition 80 is perforated so as to permit upward escape of the atmospheric air from the manifold beneath the burners. Atmospheric air is drawn in through partition 80 because of the relatively slight but definite draft created by chimney effect inside the combustion chamber 60 due to the rising heated gaseous combustion products, and by a slight aspirating effect due to the recirculatory flow of hot combustion gases as described hereinafter. It will be understood that the natural draft due to chimney effect alone is relatively slight, and that any back-pressure at the outlet 62 of the combustion chamber would have the effect of reducing or eliminating the necessary influx of atmospheric air into the combustion chamber, so that incomplete combustion would occur at the burners 66, 68 and 70 with resulting inefficient heating and generation of noxious combustion products. Such undesired operation is prevented by the construction of the present invention, as more fully explained hereinafter.

The outlet gases from blower 40 are guided upwardly by means of a generally V-shaped duct 90, which communicates along slot 92 with a septum 94 connected to an adjustable vent opening 96 on the outer side of casing 10. Adjustment of the size of the vent opening may be provided by the adjustable shutter 98, which is set in conjunction with the atmospheric air inlet shutter 82 to provide the desired net flow of fresh atmospheric air into the oven.

The louvers such as 102 in the upper and lower louvered plates 32 and 34 extend transversely to the direction of the flow of oven gases so as to capture some of the flow and direct it through the corresponding openings. The arrangement of the louvered openings for the upper and lower plates 32 and 34 is shown, respectively, in FIGURES 4 and 5, although it will be understood that other forms and distributions of louvers, or other types of flow-distributing and turbulence producing elements, may be utilized instead. The turbulence which results from the louvered arrangement assists in breaking up the relatively cool layer which tends to form over the surface of the food product 20 and therefore continuously exposes the food surface to the hot oven gases as is desired for rapid heating, while the distribution of the louvers enhance the uniformity of temperature of the oven gases in the greater portion of the oven cavity.

The motor 41 for driving the blower may be mounted on the exterior of casing 10, as is the oven temperature control 112. The oven temperature control system may be conventional, for example comprising an electrical switch which is closed when the oven control is turned on so as to operate the blower motor, together with a suitable electrical circuit (not shown) and solenoid-operated gas supply valve 77 controlled by a thermostat 120 within the oven cavity such that when the temperature in the oven reaches a value determined by the adjustment of the oven control the thermostat causes the gas supply to be shut off while the blower continues to operate until the oven temperature at the thermostat falls appreciably below the desired temperature, at which time the gas supply is automatically resumed and the ignition apparatus automatically excited so as to reinstitute combustion in the combustion chamber 60.

In operation then, turning on of the oven control 112 starts the operation of the blower 40 and ignites the burners 66, 68 and 70 in combustion chamber 60. Fresh atmospheric air entering by way of inlet 82 passes into the combustion chamber, and oven gases are vented to the exterior through the vent opening 96, whereby a sufficient influx of fresh atmospheric air is provided for complete combustion. The blower 40 causes a continuous recirculation of hot oven gases into the top of the oven, through the oven and against the food product 20, out of the oven through the bottom louvered plate 34, into the inlet of blower 40, from the outlet of blower 40 along both sides of the combustion chamber 60, and back into the oven cavity by way of the apertures 48 and 50 in the interior partition plate 30, by way of the passage 54 above the upper louvered plate 32, and through the passageway 56 between the upper exterior surface of the curved portion of combustion chamber 60 and the lower surface of the upper louvered plate 32.

It is a feature of the present invention that the direction of the forced recirculatory flow adjacent the outlet 62 from the combustion chamber by way of the passage 56 and the orifices such as 48 and 50 is generally along the same direction as the direction of exit of the hot combustion gases from combustion chamber 60. The forced flow therefore creates a definite slightly-negative pressure at the outlet of the combustion chamber 60 which assures that, no matter what the nature of the load placed in the oven for heating or the speed of operation of the blower, there will be no interference with the desired draft of atmospheric air upward through the combustion chamber 60, the recirculating gases in fact producing a slight aspirating effect which enhances the desired draft in the combustion chamber.

The arrangement therefore provides a direct-heated, forced-circulation oven operating with an atmospheric combustion air supply which is simple in construction and reliable in operation, and which provides rapid heating of the oven cavity and of the food product contained therein. Gas consumption is also economical because of the use of direct firing, because of additional heating of the recirculated gases by the walls of the combustion chamber, because of the "scrubbing" action of the forced circulation gases in conveying heat from the interior walls of the oven to the food product during intervals when the thermostat has turned off the gas burners, and because of the relatively small size and mass of the oven itself. Economy is also enhanced by the fact that relatively rapid circulation is produced in the oven while the rate of release of oven gases through the outlet vent 96 is small compared with the rate of recirculation. This is in contrast to a type of oven in which a blower might be used to move heated air through the oven without recirculation.

In commercial applications it may be desirable to provide a removable bottom floor or tray beneath the louvered plate 34 so that, in the event of spillage within the oven passing downward through the louvered openings in the lower plate, the bottom tray may be removed for easy cleaning.

It will be understood that the embodiment of the invention shown and described is by way of example only, since many details of the particular arrangement shown may be embodied in other forms. For example, quite different forms, shapes and dimensions may be employed for the oven cavity, the combustion chamber, the arrangement of the recirculation passages, and the turbulence-inducing and flow-distributing arrangements in the control system. However, the general arrangement shown is of a type which is satisfactory for the rapid reheating of frozen foods and, at the same time, produces a relatively even distribution of heat within the oven cavity by means of which ordinary cooking may be performed in the cavity at higher than normal rates and with reduced fuel consumption.

Accordingly, while the invention has been described with particular reference to specific embodiments thereof in the interest of complete definiteness, it will be understood that it may be embodied in any of a variety of diverse forms without departing from the spirit and scope of the invention as defined by the appended claims.

We claim:
1. A gas oven system, comprising:
oven walls defining an oven cavity;
a gas combustion chamber adjacent said oven cavity having an inlet for fuel gas and an inlet for air at atmospheric pressure for forming a combustible mixture in said chamber, and having an outlet to said cavity for hot combustion gases formed in said chamber;
blower means for establishing a forced recirculatory flow of oven gases through said oven and said blower means in sequence;
said blower means having outlet means adjacent said combustion chamber outlet oriented to direct said flow, adjacent said combustion chamber outlet, substantially along the direction of exit of said combustion gases from said combustion chamber outlet; and
means for venting said oven cavity to atmosphere.

2. A gas oven system in accordance with claim 1 comprising means for rendering turbulent said recirculatory flow in said oven cavity.

3. A gas oven system in accordance with claim 2, in which said last-named means comprise means projecting transversely into said flow in said oven cavity.

4. A gas oven system in accordance with claim 1, in which said combustion chamber has walls of high thermal conductivity which are disposed outside said oven cavity in the path of said recirculatory flow.

5. A gas oven system in accordance with claim 1, in which said outlet of said chamber extends substantially completely across a transverse dimension of said over cavity.

6. A gas oven system in accordance with claim 1, in which said recirculatory flow is admitted to said over cavity near the top thereof and removed therefrom near the bottom thereof, said system comprising flow-distributing means located near the top and bottom of said oven cavity for distributing said flow substantially uniformly through the central portion of said oven cavity 7. A gas oven, comprising:
an outer casing having thermally insulated walls;
an interior partition wall inside said casing and spaced therefrom, said partition wall and said insulated walls forming an oven cavity in said casing;
a combustion chamber within said casing and outside said oven cavity, between said partition wall and said casing, having a first inlet for fuel gas under pressure and a second inlet for atmospheric air for forming a combustible mixture in said chamber said chamber also having an outlet conduit at it upper end having an outlet communicating with said oven cavity for delivering hot combustion gases to said oven cavity in response to combustion in said chamber;
a circulation passage outside said oven cavity having inlet means and outlet means both communicating with said oven cavity;
a blower in said passage for abstracting oven gases from said oven cavity at said inlet means of said passage and for delivering them to said oven cavity at said outlet means of said passage to provide forced recirculatory flow through said oven and said circulation passage in series;
said outlet means of said circulation passage being disposed adjacent said outlet of said combustion chamber outlet conduit and oriented to direct flow of recirculated oven gases along the direction of combustion gases exiting from said outlet of said outlet conduit; and
a vent opening through said casing for permitting net flow of gases from said air inlet through said combustion chamber and said oven cavity to atmosphere at a rate small compared with the rate of said recirculatory flow.

8. The oven of claim 7, comprising venturi means for supplying said first inlet with fuel gas containing primary air and means for supplying said second inlet with atmospheric air in a quantity to provide secondary air and dilution air to said combustion chamber.

9. A gas oven, comprising:
- an enclosure having thermally insulating outer walls;
- an interior wall structure inside said enclosure and at least partly spaced therefrom, dividing the interior of said enclosure into an oven cavity for receiving objects to be heated and a recirculation passageway for removing oven gases from one portion of said oven cavity and returning them to another portion of said oven cavity;
- blower means in said passageway for producing forced recirculation of oven gases through said oven cavity and said recirculation passageway in series;
- a gas combustion chamber supplied with fuel gas and also supplied with air at atmospheric pressure from outside said enclosure to form a combustible mixture in said chamber and to provide therein air in excess of that required for combustion of said fuel gas, said combustion chamber having an outlet communicating with said oven cavity to deliver hot combustion gases and air thereto;
- said recirculation passageway having an outlet to said oven cavity positioned adjacent said combustion chamber outlet for directing said recirculating air along the direction of exit of said combustion gases and air from said combustion chamber outlet to assure a draft of said air from outside said enclosure through said combustion chamber; and
- a vent through said enclosure to permit venting of oven gases from said enclosure at a volume rate low compared with the volume rate of said recirculation.

References Cited

UNITED STATES PATENTS 2,524,272   10/1950   Sage _____ 126—19 X

FREDERICK KETTERER, *Primary Examiner.*